Sept. 22, 1959   L. H. OREBAUGH   2,904,922
FISH LURES
Filed Aug. 27, 1956
FIG.1.
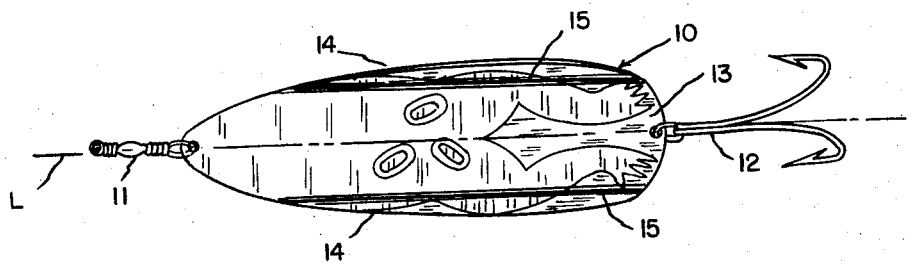
FIG.2.
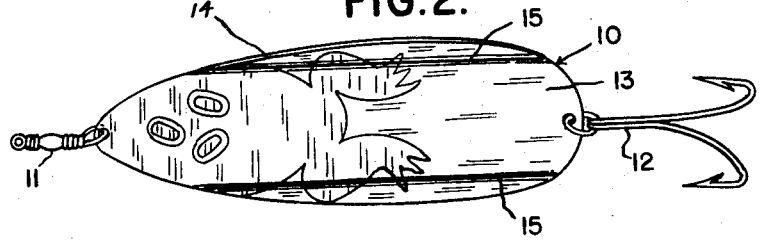
FIG.3.
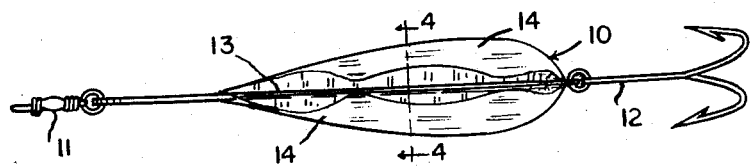
FIG.4.
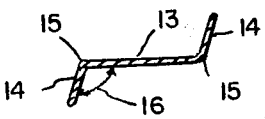
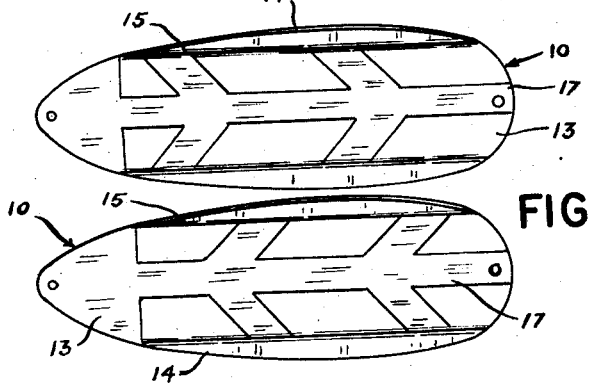
FIG.5.
FIG.6.
INVENTOR.
LOWELL H. OREBAUGH
Hauke & Hardesty.
ATTORNEYS

2,904,922

FISH LURES

Lowell H. Orebaugh, Grosse Pointe Farms, Mich.

Application August 27, 1956, Serial No. 606,474

2 Claims. (Cl. 43—42.32)

My invention relates to fish lures, and more particularly to the type of fish lures adapted for trolling, commonly known as spoons and to the application thereto of the principle of animation induced by optical illusion.

The purpose of a fish lure is of course to attract a fish's attention and deceive it into thinking the lure might be edible. Heretofore, the type of casting and trolling lures to which my invention relates have been constructed to induce rapid movement or oscillation and have generally been of brilliant or silvery hues so as to be attractive in the water. Although the mental processes and presumed intelligence of game fish are debatable subjects among sportsmen, it yet appears logical that the lure which appears most like a natural feed to a fish should be the most successful as bait.

Animation may be effected with respect to certain types of fish lures by imposing two different pictures or images, or two different geometric or other designs, to either side of a flat-sided, one piece lure, resembling in some respects a common casting or trolling spoon, which will, however, completely rotate, when drawn through the water, rather than flip back and forth, or oscillate, as does an ordinary spoon.

An object of my invention, therefore is to construct an improved lure which provides the closest approximation to a live specimen, by reason of its action and ornamentation.

Another object of the invention is to advance the sport of fishing by providing an animated lure comprising a flat, finned, one-piece structure having a representation of a life-like specimen or geometric design portrayed on each face in different positions which will appear animated during rotation.

A further object of my invention is to construct an improved fish lure by providing a finned flat member which will rotate rather than oscillate rapidly, while being drawn through the water, as in the case of an ordinary casting or trolling spoon.

A still further object of my invention is to provide an improved lure by constructing a finned flat member having different designs on each opposite surface and adapted to rotate during trolling to effect an optical illusion of animation by alternately exposing opposite sides to view.

For a more complete understanding of my invention, reference may be had to the accompanying drawing illustrating a preferred embodiment of the invention in which like characters refer to like parts throughout the several views and in which Fig. 1 is an elevational plan view of one side of the improved lure.

Fig. 2 is an elevational plan view of the opposite side thereof.

Fig. 3 is an elevational edge-on view of the lure,

Fig. 4 is a cross-sectional view taken substantially on the line 4—4 of Fig. 3.

Fig. 5 is a plan view similar to Fig. 1 but provided with another preferred design for animation, and Fig. 6 is a plan view of the opposite side of the lure of Fig. 5.

A preferred fishing lure 10 is illustrated as having conventional swivel type leader attachment 11 and a conventional hook 12 attached to opposite ends. The lure 10 comprises an intermediate flat elongated portion 13 and flat fins 14. The lure is preferably made from a single flat piece of stock bent or formed to the contour shown in Fig. 4, as viewed from the trailing ends.

The fins 14 are parallel to each other and opopsitely angled with respect to the portion 13, preferably intersecting on lines 15 parallel to the longitudinal axis "L" of the intermediate member 13.

A life-like specimen of an aquatic creature such as a frog shown in Figs. 1 and 2 is represented on each face of the lure, and different positions of the specimen are portrayed on each side, such as the extended leg portion in Fig. 1 and the contracted position in Fig. 2. As the lure rotates in its passage through the water, opposite faces of the lure will be alternately presented to view, for equal intervals, imparting a life-like animation to the specimen, as if the legs were moving.

Thus is created to the viewer, whether human or fish, an optical illusion of motion, by reason of the persistence of each images' or designs' impressions on the eye's retina, so that the two different images or designs appear as a single moving one, without relation to the forward course of the lure as a whole when being drawn through the water. This optical illusionary or animated effect of motion is, as the lure rotates, demonstrated, for example, where the pictorial likeness of a frog with the hind legs extended is depicted on one flat side of the lure, and where, on the other side, a similar likeness with the hind legs contracted is imposed. This principle may be further carried out with respect to the likenesses or pictorial images of other creatures, commonly recognized as the prey of fish; and with respect to any two differently disposed geometric or other designs selected for animation.

The construction of the fins 14 in parallel positions and intersecting the intermediate portion on lines parallel to the axis L couse the lure to rotate approximately 100–120 times per minute, rather than to oscillate back and forth as with a conventional lure, since rapid oscillation would cause a blurring effect of the specimen positions. It has also been found that the greater the intersecting angle of the fin 14 with respect to the inermediate portion 13, indicated by the reference character 16 in Fig. 4, the slower the rotation. The preferred angle is about 100 to 110 degrees, or about 10 to 20 degrees to a plane normal to the flat intermediate portion 13.

It should be noted that the fins 14, being parallel, act primarily to stabilize the lure in its longitudinal movement through the water. The rotation described above is due to water currents and turbulence experienced as the lure is drawn through the water. Thus the more rapidly the lure is drawn through the water, the greater the stability and the slower the rotation; that is, the less the effect of water current and turbulence upon the fins.

Where the images of creatures are depicted, the specimen should probably be colored and drawn as close to the natural appearance as possible, and the rest of the lure should preferably be of some color which will not be noticeable in the water, so that all that is seen will be the illusion of an apparently live figure in motion when the lure rotates at about 100 or 120 times per minute. In any case, the colors of the images and those of the background should contrast sharply.

One of the best applications of the ornamentation described is the depiction of the two images in luminous paint on a black blackground for night fishing. For example, two different geometric or other designs, such as are shown in Figs. 5 and 6 having a design 17 may prove as effective in attracting fish as if two different images of creatures were employed.

Although I have described but one preferred embodiment of my invention, it will be apparent to one skilled in the art to which the invention pertains that various changes and modifications may be made therein without departing from the spirit of the invention or the scope of the appended claims.

I claim:

1. A fish lure adapted for casting and trolling and comprising a single unitary flat elongated spoon portion having a blunt rounded trailing edge and a relatively longer rounded substantially V-shaped leading edge, the side edges of said spoon portion being oppositely angularly bent with respect to the plane of said spoon portion on lines parallel to the longitudinal axis of said spoon portion, each side edge so bent forming a single flat straight fin portion, said fin portions being disposed in planes parallel with each other for their entire lengths and with the longitudinal axis of said spoon portion, each of said fins having a gradually sloped leading end and a selectively sharply sloped trailing end into the leading and trailing edges of said spoon portion, said fin portions being constructed and arranged to effect a substantially non-turbulent rotation of said lure around the longitudinal axis thereof as said lure is pulled through water, and all portions of said lure being disposed in planes extending parallel with the longitudinal motion of said lure when pulled through the water.

2. A fish lure adapted for casting and trolling and comprising a single unitary flat elongated intermediate spoon portion, the side edges of said spoon portion being oppositely angularly bent with respect to the plane of said spoon portion on lines parallel to the longitudinal axis of said spoon portion, each side edge so bent forming a single flat straight fin portion, said fin portions being disposed in planes parallel with each other for their entire lengths and with the longitudinal axis of said intermediate portion, said lure having a representation of a figure portrayed on each opposite face, each representation portraying a distinct different animated position of the figure, said fin portions being constructed and arranged to effect a substantially non-turbulent rotation of said lure around the longitudinal axis thereof as said lure is pulled through water, the angular relation of said fins to said intermediate portion being such as to produce a rotation predetermined to impart a distinct illusion of animation to said figures as alternate faces of said lure are presented to view, and all portions of said lure being disposed in planes extending parallel with the longitudinal motion of said lure when pulled through the water.

References Cited in the file of this patent

UNITED STATES PATENTS

| | | |
|---|---|---|
| 830,404 | Barnes | Sept. 4, 1906 |
| 1,899,788 | Baldwin | Feb. 28, 1933 |
| 1,986,282 | Parker | Jan. 1, 1935 |
| 2,235,905 | Sherwood | Mar. 25, 1941 |
| 2,611,987 | Hagen | Sept. 30, 1952 |
| 2,747,318 | Bailey | May 29, 1956 |